No. 677,907. Patented July 9, 1901.
T. P. VANDELEUR.
BICYCLE LOCK.
(Application filed Aug. 13, 1900.)

(No Model.)

Witnesses
J. J. Rowley
U. F. May

Inventor
Thomas Pakenham Vandeleur
per J. B. Stewart,
Attorney.

UNITED STATES PATENT OFFICE.

THOMAS PAKENHAM VANDELEUR, OF CLARENCE ROAD, ISLAND OF JERSEY.

BICYCLE-LOCK.

SPECIFICATION forming part of Letters Patent No. 677,907, dated July 9, 1901.

Application filed August 13, 1900. Serial No. 26,782. (No model.)

*To all whom it may concern:*

Be it known that I, THOMAS PAKENHAM VANDELEUR, fruit-grower, a subject of the Queen of Great Britain and Ireland, residing at 13 Clarence Road, Island of Jersey, have invented certain new and useful Improvements in Connection with a Locking Device for Cycles, of which the following is a specification.

This invention relates to an improved locking device applied to the handle-bar of a bicycle for fixing or locking the steering-wheel so as to prevent the latter being revolved or the machine being operated. For this purpose a metal ring or clamp is fitted to the handle-bar, the said ring or clamp being formed with an arm or extension having a hole or perforation through it. It is also formed with a shorter arm a short distance from and parallel to the first-named arm, the space between the said arms permitting of the latter being drawn together by means of a small screw-bolt passing through a hole in each and provided with a nut for screwing up and fixing the ring or clamp around and to the handle-bar. The brake-handle is also formed with a small hole or perforation, which when the said handle is raised to apply the brake to the front wheel to prevent its revolution coincides with the hole in the first-named arm of the clamp and permits the bow or bar of a small padlock being passed through the said holes, thus locking the brake-handle in its raised or operating position to the arm of the clamp fixed to the handle-bar and forcing the brake against the steering-wheel, so as to prevent its revolution. By this means it is impossible to drive or wheel the bicycle without unlocking and removing the padlock.

Figure 1:
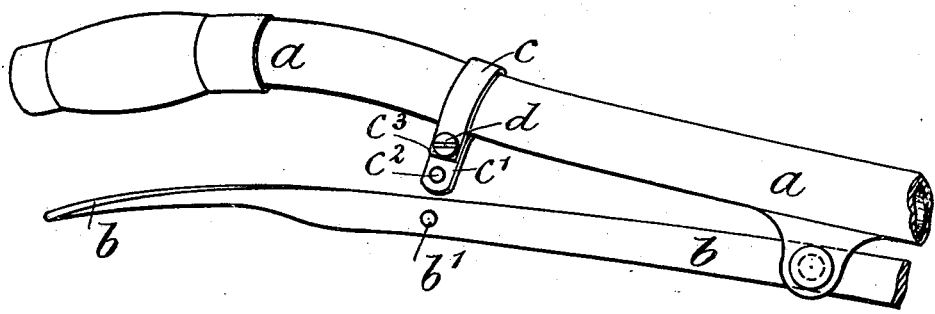
Figure 2:
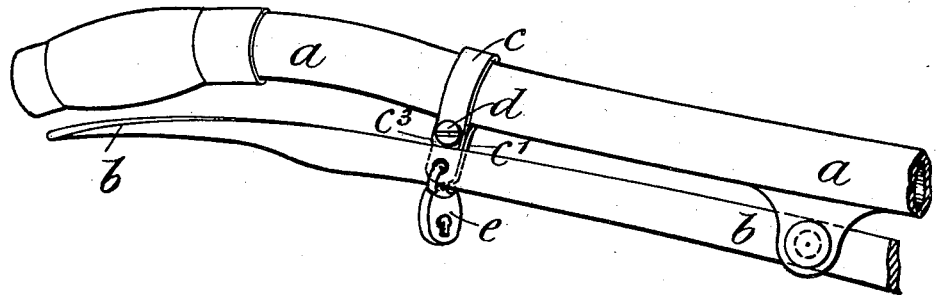

In the accompanying drawings, Figure 1 represents a portion of an ordinary handle-bar of a bicycle and the brake-handle in connection therewith in its normal or unlocked position, and Fig. 2 is a similar view showing the brake-handle in its raised or locked position.

$a$ is the handle-bar, and $b$ is the pivoted brake-handle, of ordinary construction.

$c$ is the clamp or ring fitted to the bar $b$ and formed with the arm or extension $c'$, provided with the hole or perforation $c^2$.

$c^3$ is the short arm forming the other extremity of the clamp or ring, and $d$ is the small screw-bolt passing through holes in the arms and provided with the nut $d'$ for drawing the arms together and causing the clamp or ring to grip the handle-bar.

$b'$ is the hole formed in the brake-handle $b$, and $e$ is the padlock, the bow or bar of which is passed through the hole $b'$ of the handle $b$ and through the hole $c^2$ of the arm or extension $c'$, thus locking the brake-handle to the said arm $c'$ and holding the brake hard upon the front wheel, so as to prevent the latter revolving.

Having now fully described the nature of my said invention, what I claim, and desire to secure by Letters Patent, is—

In a locking device for bicycles the combination with the handle-bar $a$ and brake-handle $b$, of a clamp or ring $c$ fixed to the handle-bar and formed with arms or extensions $c'$, $c^3$, and a padlock $e$ the bow or bar of which is passed through a hole $b'$ formed in the handle $b$ and through a hole $c^2$ formed in the arm $c'$ so as to lock the brake-handle to the handle-bar and hold the brake hard against the wheel, substantially as described.

In witness whereof I have hereunto set my hand in the presence of two witnesses.

THOMAS PAKENHAM VANDELEUR.

Witnesses:
ERNEST ALBERT JEAN,
E. LE ROY DAVIS.